(12) United States Patent
Knechtges et al.

(10) Patent No.: US 9,616,870 B2
(45) Date of Patent: Apr. 11, 2017

(54) ELECTROHYDRAULIC MOTOR VEHICLE BRAKE SYSTEM AND METHOD FOR OPERATING THE SAME

(71) Applicant: Lucas Automotive GmbH, Koblenz (DE)

(72) Inventors: Josef Knechtges, Mayen (DE); Stefan Grieser-Schmitz, Koblenz (DE)

(73) Assignee: Lucas Automotive GmbH, Koblenz (DE)

( * ) Notice: Subject to any disclaimer, the term of this patent is extended or adjusted under 35 U.S.C. 154(b) by 119 days.

(21) Appl. No.: 14/654,641

(22) PCT Filed: Nov. 28, 2013

(86) PCT No.: PCT/EP2013/074922
§ 371 (c)(1),
(2) Date: Jun. 22, 2015

(87) PCT Pub. No.: WO2014/095283
PCT Pub. Date: Jun. 26, 2014

(65) Prior Publication Data
US 2015/0344014 A1  Dec. 3, 2015

(30) Foreign Application Priority Data
Dec. 21, 2012  (DE) .................. 10 2012 025 423

(51) Int. Cl.
*B60T 13/66* (2006.01)
*B60T 13/68* (2006.01)
(Continued)

(52) U.S. Cl.
CPC ............ *B60T 13/686* (2013.01); *B60T 7/042* (2013.01); *B60T 8/4077* (2013.01);
(Continued)

(58) Field of Classification Search
None
See application file for complete search history.

(56) References Cited

U.S. PATENT DOCUMENTS 7,321,209 B2 * 1/2008 Westerinen ............ H02J 7/345
                                                            318/139
9,227,611 B2 * 1/2016 Gilles ................... B60T 8/3275
(Continued)

FOREIGN PATENT DOCUMENTS

DE       10338046 A1    3/2005
DE       10355239 A1    3/2005
(Continued)

*Primary Examiner* — Redhwan k Mawari
*Assistant Examiner* — Edward Torchinsky
(74) *Attorney, Agent, or Firm* — MacMillan, Sobanski & Todd, LLC

(57) ABSTRACT

The invention relates to a technique for operating an electrohydraulic motor vehicle brake system comprising a master cylinder, an electromechanical actuator for generating a hydraulic pressure at a plurality of wheel brakes and a set of electrically actuable valve arrangements. The set of valve arrangements comprises a first valve arrangement between the master cylinder and every wheel brake. The first valve arrangements can be controlled in the multiplex operation to generate, by means of the electromechanical actuator, the respective brake pressure intended for each of the wheel brakes. According to an aspect of this technique, the method comprises the steps of: generating a feedback current during the multiplex operation by operating an electric motor of the electromechanical actuator as a generator and supplying the feedback current to at least one electrical load.

20 Claims, 7 Drawing Sheets

(51) Int. Cl.
*B60T 7/04* (2006.01)
*B60T 8/40* (2006.01)
*B60T 8/44* (2006.01)
*B60T 13/74* (2006.01)

(52) U.S. Cl.
CPC ............ *B60T 8/4081* (2013.01); *B60T 8/447* (2013.01); *B60T 13/662* (2013.01); *B60T 13/745* (2013.01); *B60T 2270/604* (2013.01); *B60T 2270/82* (2013.01)

(56) References Cited

U.S. PATENT DOCUMENTS

| | | | |
|---|---|---|---|
| 2002/0163251 A1* | 11/2002 | Crombez | B60K 6/44 303/152 |
| 2006/0108867 A1* | 5/2006 | Ralea | B60T 1/10 303/152 |
| 2012/0144823 A1* | 6/2012 | Usui | B60T 13/745 60/545 |
| 2013/0199364 A1* | 8/2013 | Weiberle | B60L 7/18 92/139 |
| 2014/0197680 A1* | 7/2014 | Gilles | B60T 8/3275 303/2 |

FOREIGN PATENT DOCUMENTS

| | | |
|---|---|---|
| DE | 102009043484 A1 | 3/2011 |
| DE | 102010042694 A1 | 2/2012 |
| DE | 102012205340 A1 | 10/2012 |
| EP | 2058189 A1 | 5/2009 |
| EP | 2460701 A2 | 6/2012 |
| JP | 2010269642 A | 12/2010 |
| WO | 2006111393 A1 | 10/2006 |
| WO | 2008003614 A1 | 1/2008 |
| WO | 2009013586 A2 | 1/2009 |
| WO | 2010091883 A1 | 8/2010 |
| WO | 2011141158 A2 | 11/2011 |
| WO | 2012152352 A1 | 11/2012 |

* cited by examiner

ELECTROHYDRAULIC MOTOR VEHICLE BRAKE SYSTEM AND METHOD FOR OPERATING THE SAME

CROSS-REFERENCE TO RELATED APPLICATIONS

This application is a national stage of International Application No. PCT/EP2013/074922 filed Nov. 28, 2013, and which claims priority to German Patent Application No. 10 2012 025 423.7 filed Dec. 21, 2012, the disclosures of which are incorporated herein by reference in their entirety.

BACKGROUND OF THE INVENTION

The present disclosure relates in general to the field of vehicle brake systems. In concrete terms, an electrohydraulic vehicle brake system with an electromechanical actuator for actuating the brake system is described.

Electromechanical actuators have already been used for some time in vehicle brake systems, for example to realise an electric parking brake function (EPB). In the case of electromechanical brake systems (EMB), they replace the conventional hydraulic cylinders on the wheel brakes.

Technical advancements have resulted in a continuous increase in the capacity of the electromechanical actuators. The use of such actuators in the implementation of modern vehicle-dynamics control systems has therefore also been taken into consideration. Such control systems include an antilock braking system (ABS), a traction control system (TCS) or an electronic stability program (ESP), also known as vehicle stability control (VSC).

WO 2006/111393 A discloses an electrohydraulic brake system with a high dynamic electromechanical actuator, which takes over the pressure modulation in the vehicle-dynamics control operation. The electromechanical actuator described in WO 2006/111393 A is provided to act directly on a master cylinder of the brake system. As a result of the high dynamics of the electromechanical actuator, the hydraulic components of the brake system disclosed in WO 2006/111393 A can be reduced to a single 2/2-way valve for each wheel brake. To realise individual pressure modulations for each wheel, the valves are then controlled individually or in groups in multiplex mode.

However, the minimisation to only one valve for each wheel brake also creates challenges such as an undesired pressure compensation when valves are open at the same time. A solution based on a high dynamic control behaviour for this is disclosed in WO 2010/091883 A.

WO 2010/091883 A discloses an electrohydraulic brake system with a master cylinder and a tandem piston received therein. The tandem piston can be actuated by means of an electromechanical actuator. The electromechanical actuator comprises an electric motor, which is arranged concentrically to the tandem piston, and a gear arrangement which converts a rotational movement of the electric motor into a translatory movement of the piston. The gear arrangement comprises a ball screw drive with a ball screw nut, which is coupled in torsion-resistant manner to a rotor of the electric motor, and a ball screw spindle acting on the tandem piston.

A further electrohydraulic brake system with an electromechanical actuator acting on a master cylinder piston is disclosed in WO 2012/152352 A. This system can operate in regenerative mode (generator operation).

SUMMARY OF THE INVENTION

The aim is to provide an electrohydraulic motor-vehicle brake system and a method for operating such a brake system, which have an advantageous functionality, particularly in terms of safety aspects.

According to one aspect, a method is indicated for operating an electrohydraulic motor-vehicle brake system, which has a master cylinder, an electromechanical actuator for generating a hydraulic pressure at a plurality of wheel brakes and a set of electrically actuable valve arrangements, the set of valve arrangements each comprising a first valve arrangement between the master cylinder and each wheel brake in order to generate the respective braking pressure intended for each of the wheel brakes by means of the electromechanical actuator. The method comprises the steps of generating a regenerative current by operating an electric motor of the electromechanical actuator as a generator and energising at least one electrical load with the regenerative current.

The first valve arrangement can be controlled in a multiplex operation, with the regenerative current being generated during the multiplex operation by operating the electric motor as a generator.

The multiplex operation can be a time division multiplex operation. In this, it is generally possible to specify individual time slots. On the other hand, one or more of the valve arrangements, which are actuated during the corresponding time slot (for example by changing the switching status from open to closed and/or vice versa one or more times) can be associated with a single time slot. According to one realisation, precisely one time slot is associated with each of the first valve arrangements. One or more further valve arrangements can be associated with one or more further time slots.

The regenerative current of the electric motor of the electromechanical actuator can relate to a braking of the electric motor, i.e. a speed reduction. This speed reduction can be effected in a time period of 0.1 to 50 ms (for example 0.5 to 10 ms). The speed reduction can take place here in a range between 200 and 3000 $min^{-1}$ (for example 500 to 1500 $min^{-1}$).

According to one aspect, the energising of the electrical load with the regenerative current takes place selectively, i.e. not with every speed reduction of the electric motor. The energising of the electrical load can therefore be limited to situations in which a particularly high regenerative current is to be expected. The expected regenerative current can be determined on the basis of the expected speed reduction. Additionally or alternatively to this, the expected regenerative current can also be evaluated on the basis of the time period in which the speed reduction takes place.

The method can furthermore comprise the step of connecting an electrical load to the electric motor in order to fully or partially consume the regenerative current generated by the electric motor in generator mode. The temporal connection of the load to the electric motor can depend on the level of the (e.g. particular) regenerative current.

The regenerative current generated by the electric motor as a generator can be estimated or pre-calculated on the basis of motor parameters, such as for example the expected speed reduction of the electric motor, an expected revision of the movement direction of the electric motor and/or with reference to the time period in which the speed reduction or reversal of the movement direction takes place. Additionally or alternatively to this, the regenerative current generated by the electric motor as a generator can be measured. The method can furthermore comprise the step of detecting a (for example measured) signal indicating a regenerative current generated by the electric motor. The measuring signal can be for example a voltage signal which is proportional to the regenerative current.

The method can furthermore comprise the step of comparing the signal to a reference signal indicating an upper current limit. The reference signal can be a signal which indicates a specified upper current limit (for example a voltage signal with a fixedly specified amplitude).

The connection of a load can depend on the comparison of the signal with the specified reference signal. In concrete terms, a load can then always be connected when the signal (for exit) ample the amplitude or the magnitude of the signal) exceeds the reference signal (i.e. the amplitude or the magnitude of the reference signal). In particular, the load can remain connected only so long as the signal exceeds the reference signal. If the measuring signal falls below the reference signal, the load can be disconnected from the electric motor again. It is therefore possible to enable a time-limited connection of a load, with the load always being electrically coupled to the electric motor when the expected regenerative current exceeds a specified upper current limit. If the regenerative current falls below the specified threshold value, the load can be electrically decoupled from the electric motor again. It is thus particularly possible to reduce regenerative current peaks.

According to one variant, the electromechanical actuator can be designed to actuate the master cylinder piston for generating a hydraulic pressure. According to another variant, the electromechanical actuator can be provided for actuating a cylinder arrangement, provided in addition to the master cylinder, for the purpose of generating hydraulic pressure. These variants can be used for example within the framework of a brake-by-wire (BBW) operation in which the brake pedal is (normally) mechanically decoupled from the master cylinder piston. In a brake system which is designed for the BBW operation, a mechanical actuator can be used in an emergency braking operation (for example in the event of a failure of a BBW component) to actuate the piston. This is also known as "push-through" mode.

Depending on the design of the vehicle brake system, the selective decoupling of the brake pedal from the master cylinder piston can be effected by means of a multipurpose decoupling device. In the case of a brake system which is designed according to the BBW principle, with the exception of an emergency braking operation (in which the brake pedal is coupled to the master cylinder piston by way of the mechanical actuator) it is possible to provide a continuous decoupling. In the case of a regenerative brake system, a decoupling of this type can take place at least within the framework of a regenerative braking operation (generator mode). In other brake systems, it is possible to completely dispense with the decoupling device and a simulation device for providing a pedal reaction behaviour.

To control the electromechanical actuator and optional further components of the vehicle brake system (e.g. the first valve arrangement and/or the electrical load), the brake system can have suitable control devices. These control devices can comprise electrical, electronic or program-controlled assemblies and combinations thereof. For example, the control devices can be provided in a common control device or in a system made up of separate control devices (Electronic Control Units, ECUs).

The electrical load energised with the regenerative current can be any load in the motor vehicle. For example, a rear window heater or a seat heater could be energised with the regenerative current. However, as an alternative to this, the electrical load could also simply be a resistor or resistive circuit which converts the regenerative current or a proportion thereof into thermal energy.

Additionally or alternatively to this, the electrical load can also be part of the brake system. Therefore, the electrical load could be formed by the electric motor of the electromechanical actuator. A field current can then be generated in the electric motor by means of the regenerative current. Alternatively or additionally to the electric motor, the electrical load can also be comprised of at least one valve arrangement from the set of valve arrangements, Therefore, at least one of the first valve arrangements could form the electrical load. Additionally or alternatively to this, the set of valve arrangements can comprise at least one second valve arrangement which enables the additional connection of a hydraulic simulation device to provide a pedal reaction behaviour. In this case, the second valve arrangement can function as an electrical load for the regenerative current.

If the at least one electrical load comprises a valve arrangement, this can be energised by means of the regenerative current with a higher current than in normal operation. The normal operation here can be defined by the nominal current and/or the nominal voltage sufficient for a valve actuation (open/or close). The regenerative current can be fed to the valve arrangement by way of a pulse width modulation. Alternatively to this, the valve arrangement can be energised by a constant current.

Likewise provided is a computer program product with program code means for carrying out the method presented here when the computer program product runs on at least one processor.

The computer program product can be comprised of a motor-vehicle control device or motor-vehicle control device system.

An electrohydraulic motor-vehicle brake system is furthermore described, which has a master cylinder, an electromechanical actuator for generating a hydraulic pressure at a plurality of wheel brakes, a set of electrically actuable valve arrangements, each with a first valve arrangement between the master cylinder and each wheel brake, in order to generate the respective brake pressure intended for each of the wheel brakes by means of the electromechanical actuator, and a control device or control device system which is designed to generate a regenerative current by operating the electric motor of the electromechanical actuator as a generator, and for energising at least one electrical load with the regenerative current.

The control device or control device system can be designed to control the first valve arrangements (152, 154, 156, 158) in multiplex mode, with the regenerative current being generated during the multiplex operation by operating the electric motor (134) as a generator.

The control device or control device system can furthermore be designed to detect a signal which indicates a regenerative current generated by an electric motor and to compare the signal with a reference signal indicating an upper current limit. The control device or control device system can furthermore be designed to connect the electrical load to the electric motor when the signal exceeds the reference signal.

To generate the hydraulic pressure, the electromechanical actuator can act on a piston received in the master cylinder. As an alternative to this, it is conceivable for the electromechanical actuator to act on a piston which is provided in a cylinder provided in addition to the master cylinder. It is possible here for the additional cylinder to be, or become, hydraulically coupled to the wheel brakes.

The additional cylinder can, however, also be directly hydraulically coupled to the master cylinder. The additional cylinder can then be fluidically decoupled from the wheel brakes and a hydraulic pressure at the wheel brakes can be built up (simply) by way of the master cylinder. In this case, the hydraulic pressure generated in the additional cylinder-piston device with the aid of the electromechanical actuator is preferably transmitted directly to the master cylinder in order to hydraulically actuate the piston received in the master cylinder. The hydraulic pressure provided by the additional cylinder-piston device can be used for hydraulic amplification in the braking operation. The hydraulic pressure provided can, however, also be used for the sole actuation of the piston received in the master cylinder within the framework of a brake-by-wire braking operation.

Other advantages of this invention will become apparent to those skilled in the art from the following detailed description of the preferred embodiments, when read in light of the accompanying drawings.

DETAILED DESCRIPTION OF THE PREFERRED EMBODIMENTS

Figure 1:
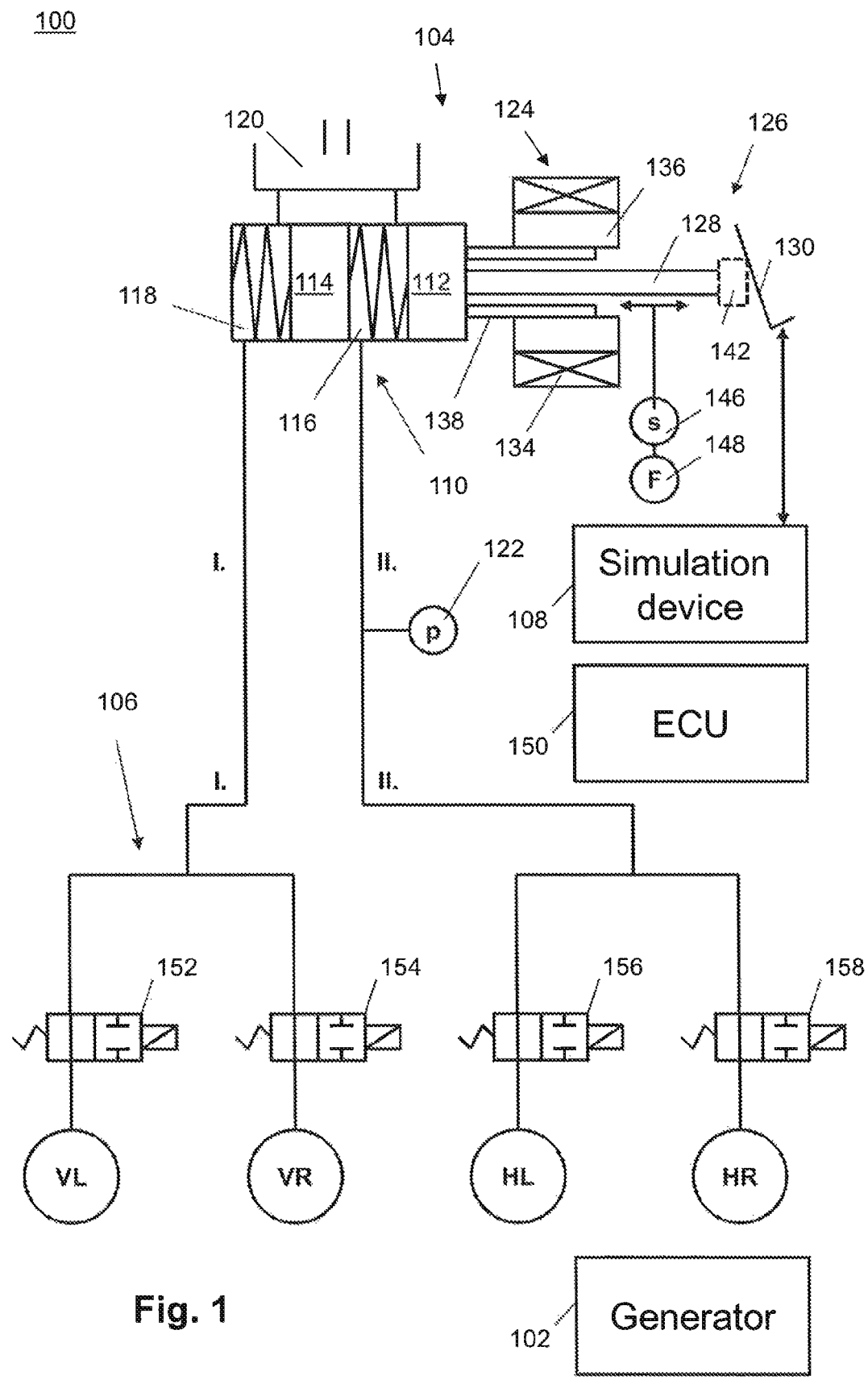
FIG. 1 a first exemplary embodiment of an electrohydraulic vehicle brake system.

FIG. 1 shows a first exemplary embodiment of a hydraulic vehicle brake system 100 which is based on the brake-by-wire (BBW) principle. The brake system 100 can be optionally operated in regenerative mode (e.g. in the case of hybrid vehicles). To this end, an electric machine 102 is provided, which offers a generator functionality and can be selectively connected to wheels and an energy store, e.g. a battery (not shown).

As shown in FIG. 1, the brake system 100 comprises a master cylinder assembly 104, which can be mounted on a vehicle splashboard. A hydraulic control unit (HCU) 106 of the brake system 100 is functionally arranged between the master cylinder assembly 104 and four wheel brakes VL, VR, HL and HR of the vehicle. The HCU 106 is constructed as an integrated assembly and comprises a plurality of hydraulic individual components as well as a plurality of fluid inlets and fluid outlets. A simulation device 108 (only shown schematically) for providing a pedal reaction behaviour in the braking operation is furthermore provided. The simulation device 108 can be based on a mechanical or hydraulic principle. In the latter case, the simulation device 108 can be connected to the HCU 106.

The master cylinder assembly 104 has a master cylinder 110 with a piston which is displaceably received therein. In the exemplary embodiment, the piston is constructed as a tandem piston with a primary piston 112 and a secondary piston 114 and defines two mutually separate hydraulic chambers 116, 118 in the master cylinder 110. For the hydraulic fluid supply, the two hydraulic chambers 116, 118 of the master cylinder 110 are connected to a non-pressurised hydraulic fluid reservoir 120 by way of a respective connection. Each of the two hydraulic chambers 116, 116 is furthermore coupled to the HCU 106 and defines a respective brake circuit I. and II. In the exemplary embodiment, a hydraulic sensor 122, which could also be integrated in the HCU 106, is provided for the brake circuit I.

The hydraulic assembly 104 further comprises an electromechanical actuator (i.e. an electromechanical control element) 124 and a mechanical actuator (i.e. a mechanical control element) 126. Both the electromechanical actuator 124 and the mechanical actuator 126 enable the master cylinder piston to be activated and, to this end, act on an entry-side end face of this piston, more precisely the primary piston 112. The actuators 124, 126 are constructed in such a way that they are able to actuate the master cylinder piston independently of one another (and separately or together).

The mechanical actuator 126 has a force-transmission element 128 which is constructed in the form of a rod and is able to act directly on the entry-side end face of the primary piston 112. As shown in FIG. 1, the force-transmission element 128 is coupled to a brake pedal 130. It goes without saying that the mechanical actuator 126 can comprise further components, which are functionally arranged between the brake pedal 130 and the master cylinder 110. Further components of this type can be both mechanical and hydraulic in nature. In the latter case, the actuator 126 is constructed as a hydraulic-mechanical actuator 126.

The electromechanical actuator 124 has an electric motor 134 and a gear 136, 138 following the electric motor 134 on the output side. In the exemplary embodiment, the gear is an arrangement comprising a rotatably mounted nut 136 and a spindle 138 which is in engagement with the nut 136 (e.g. by way of rolling bodies such as balls) and is movable in the axial direction. In other exemplary embodiments, rack and pinion gears or other gear types can be used. In the present exemplary embodiment, the electric motor 134 has a cylindrical configuration and extends concentrically to the force-transmission element 128 of the mechanical actuator 126. In more precise terms, the electric motor 134 is arranged radially outside in relation to the force-transmission element 128. A rotor (not illustrated) of the electric motor 134 is coupled in torsion-resistant manner to the gear nut 136 in order to set this in rotation. A rotational movement of the nut 136 is transmitted to the spindle 138 in a manner which results in an axial displacement of the spindle 138. The left end face of the spindle 138 in FIG. 1 can thereby arrive in contact with the right end face of the primary piston 112 in FIG. 1 (optionally by way of an intermediate element) and consequently displace the primary piston 112 (together with the secondary piston 114) to the left in FIG. 1. Furthermore, the piston arrangement 112, 114 can also be displaced to the left in FIG. 1 by the force-transmission element 128 of the mechanical actuator 126, which force-transmission element 128 extends through the spindle 138 (which is constructed as a hollow body). A displacement of the piston arrangement 112, 114 to the right in FIG. 1 is effected by means of the hydraulic pressure prevailing in the hydraulic chambers 116, 118 (when the brake pedal 130 is released and, if applicable, upon a motor-driven displacement of the spindle 138 to the right).

In the variant of the hydraulic cylinder assembly 100 which is shown in FIG. 1, the electromechanical actuator 124 is arranged in such a way that it can act directly on the piston (more precisely on the primary piston 112) of the master cylinder 110 to build up a hydraulic pressure at the wheel brakes. In other words, the piston 112 of the master cylinder is mechanically displaced directly by the electromechanical actuator 124. In an alternative design of the master cylinder assembly 100, the piston 112 of the master cylinder 110 can be hydraulically actuated with the aid of the electromechanical actuator 124 (not shown in FIG. 1). In this case, the master cylinder 110 can be fluidically coupled to a further cylinder-piston device cooperating with the electromechanical actuator 124. In concrete terms, the cylinder-piston device coupled to the electromechanical actuator 124 can, for example, be fluidically coupled at the outlet side to the primary piston 112 of the master cylinder 110 in such a way that a hydraulic pressure generated in the cylinder-piston device acts directly on the primary piston and therefore results in a displacement of the primary piston 112 in the master cylinder 110. In one realisation, the effective hydraulic pressure then causes the primary piston 112 to be displaced (to the left in FIG. 1) in the master cylinder 110 until the hydraulic pressure generated in the master cylinder chambers 116, 118 corresponds to the hydraulic pressure generated in the additional cylinder-piston device.

As shown in FIG. 1, a decoupling device 142 is functionally provided between the brake pedal 130 and the force-transmission element 128. The decoupling device 142 enables a selective decoupling of the brake pedal 130 from the piston arrangement 112, 114 in the master cylinder 110, for example by interrupting a force-transmission path. The functionalities of the decoupling device 142 and the simulation device 108 are explained in more detail below. In this connection, it should be pointed out that the brake system 100 illustrated in FIG. 1 is based on the brake-by-wire (BBW) principle. This means that, within the framework of normal service braking, both the decoupling device 142 and the simulation device 108 are activated. The brake pedal 130 is accordingly decoupled from the force-transmission element 128 (and therefore from the piston arrangement 112, 114 in the master cylinder 110) and the piston arrangement 112, 114 can be actuated solely by way of the electromechanical actuator 124.

The customary pedal reaction behaviour in this case is provided by the simulation device 108 coupled to the brake pedal 130.

Therefore, within the framework of service braking, the electromechanical actuator 124 takes over the function of generating the brake force. A brake force which is instigated by depressing the brake pedal 130 is generated here in that, by means of the electric motor 134, the spindle 138 is displaced to the left in FIG. 1 and, as a result, the primary piston 112 and the secondary piston 114 of the master cylinder 110 are also moved to the left. Hydraulic fluid is thereby delivered from the hydraulic chambers 116, 118 to the wheel brakes VL, VR, HL and HR via the HCU 106.

The extent of the resultant brake force of the wheel brakes VL, VR, HL and HR is set according to a sensor-detected brake pedal actuation. To this end, a travel sensor 146 and a force sensor 148 are provided, whereof the output signals are evaluated by a control device (electric control unit ECU) 50 controlling the electric motor 134. The travel sensor 146 records an actuation travel linked to an actuation of the brake pedal 130, whilst the force sensor 148 records an actuating force linked thereto. Depending on the output signals of the sensors 146, 148 (and possibly the pressure sensor 122), a control signal for the electric motor 134 is generated by the control device 150.

Following the more detailed explanation of the procedures for service braking, the emergency braking operation is now briefly outlined. The emergency braking operation results, for example, from the failure of the vehicle battery or a component of the electromechanical actuator 124. A deactivation of the decoupling device 142 (and the simulation device 108) in emergency braking mode enables a direct coupling of the brake pedal 130 to the master cylinder 110, namely by way of the force-transmission element 128 ("push-through" mode). The emergency braking operation is instigated by depressing the brake pedal 130. The brake pedal actuation is then transmitted to the master cylinder 110 via the force-transmission element 128. This results in the piston arrangement 112, 114 being displaced to the left in FIG. 1. Hydraulic fluid is consequently delivered from the hydraulic chambers 116, 118 of the master cylinder 110 to the wheel brakes VL, VR, HL and HR via the HCU 106 for the purpose of generating a brake force.

In the embodiment according to FIG. 1, the specific valves for the vehicle-dynamics control operation (e.g. TCS and ESP mode) can be omitted in the HCU 106 with the exception of four valves 152, 154, 156, 158 between the master cylinder 110 and the wheel brakes VL, VR, HL and HR. For this embodiment of the HCU 106, it is therefore possible to refer to the valve arrangement disclosed in WO 2010/091883 A or WO 2011/141158 A (cf. FIG. 15) which only has four valves 152, 154, 156, 158 (and the corresponding control means).

The hydraulic pressure modulation in the control operation is effected by means of the electromechanical actuator 124. In other words, the electromechanical actuator 124 is not only triggered to generate the brake force within the context of service braking, but also for example for implementing the vehicle-dynamics control operation (i.e. for example in ABS and/or TCS and/or ESP control mode). Together with the triggering of the electromechanical actuator 124, a triggering of the valves 152, 154, 156, 158 for an individual wheel or individual wheel group takes place in a temporal multiplex operation. For the multiplex operation, it is then possible for a separate time slot, in which the particular valve can be triggered (for example opened and/or closed), to be associated with each of the valves 152, 154, 156, 158. In the implementation shown in FIG. 1, no further valves are present between the wheel brakes VL, VR, HL and HR and the master cylinder 110 for vehicle-dynamics control purposes.

In multiplex mode, for example, some or all of the valves 152, 154, 156, 158 can be open first and, at the same time, a hydraulic pressure can be built up on some or all of the associated wheel brakes VL, VR, HL and HR by means of the electromechanical actuator 124. When a target pressure for an individual wheel is reached, the corresponding valve 152, 154, 156, 158 is then closed whilst one or more further valves 152, 154, 156, 158 remain open until the respective target pressure is also reached there. In multiplex mode, the four valves 152, 154, 156, 158 are therefore time-slot synchronously opened and closed individually for each wheel or wheel group depending on the respective target pressure.

According to one embodiment, the valves 152, 154, 156, 158 are realised as 2/2-way valves and constructed for example as non-adjustable shut-off valves. In this case, therefore, it is not possible to set an opening cross-section in the manner that would apply to proportional valves. In another embodiment, the valves 152, 154, 156, 158 are realised as proportional valves with an adjustable opening cross-section.

For a time-slot synchronous hydraulic-pressure adjustment in multiplex mode, the electric motor 134 has to be repeatedly increased (for example accelerated from an idle state) and braked (for example decelerated to the idle state). Both the increase and reduction in the motor speed take place here within extremely short time periods on account of the brief time slots (typically in the millisecond range). The motor therefore frequently has to reduce the speed by 1000 $min^{-1}$ or more within 2 to 3 ms. Within the context of a rapid speed reduction of this type, the electric motor 134 acts like a generator which generates a current (i.e. similar to the generator 102). Since the electric motor 124 is connected to the vehicle electrical system, the current generated in generator mode of the electric motor 134 is supplied into the vehicle electrical system ("regenerative current").

The regenerative current can lead to voltage peaks in the vehicle electrical system, which can be harmful to other loads connected to the vehicle electrical system. Such loads include for example the control device 150 or other control devices which occasionally implement safety-relevant functionalities. For example, some control devices are programmed such that they are reset when the voltage at the cable harness rises above 16 volts. This reset takes place irrespective of how long the increased voltage is applied. Even the briefest of regenerative currents in the generator mode of the electric motor 134 can therefore effect such a reset. For this reason, many vehicle manufacturers have switched to limiting the maximum permitted regenerative current to a certain value (for example −15 A).

To limit the regenerative current, it would of course be possible for the electric motor 134 to be braked more slowly but, on the other hand, in multiplex mode, the requirement often arises for the build-up or reduction in hydraulic pressure at the wheel brakes VL, VR, HL and HR to take place sequentially, i.e. in succession, in times slots associated with the valves 152, 154, 156, 158. However, the system-related time period of the time slots, and therefore the maximum time available for braking the electric motor 134, cannot be randomly prolonged. This means that the regenerative current peaks cannot be randomly reduced.

For this reason, it is proposed that the emergence of higher regenerative currents should be taken into account, but these should not be supplied to the vehicle electrical system in uncontrolled manner. It is instead proposed that, during the emergence of such regenerative currents within the framework of the multiplex operation, an electrical load of the motor vehicle be energised therewith. Since the regenerative current peaks occur in the millisecond range, the energising of the electrical load, for example a rear window heater or a seat heater, also only has to take place in the millisecond range.

According to one variant, it is proposed that regenerative current peaks be lowered internally in the brake system 100. It would be possible for example to use the multiplex valves 154, 154, 156, 158 to lower regenerative current peaks. In multiplex mode, during a particular time slot, only the valve associated with this time slot, for example the valve 152, is typically opened in order to adjust the hydraulic pressure at the associated wheel brake VL by means of the electromechanical actuator 124. The remaining valves 154, 156, 158 are, on the other hand, closed. To close the valves 154, 156, 158, these have to be energised. Therefore, during the multiplex operation, those multiplex valves 154, 156, 158 which are closed and therefore energised, can be additionally acted upon by means of the regenerative current. The switching status of the valves is not altered thereby, the electromagnetic locking force is simply increased and a coil integrated in the valve generates more heat.

The respective coil temperature can be modelled or monitored to prevent damage to the valve. The regenerative current can therefore be supplied cyclically (for example time-slot synchronously) to the closed valves 152, 154, 156, 158 in each case in order to reduce their thermal load. In general, the regenerative current can be supplied via pulse-width modulation (PWM). Additionally or alternatively to this, if one of the valves 152, 1554, 156, 158 reaches its temperature limit (or is to be acted upon by less current for functional reasons), other valves (not shown in FIG. 1) or other electrical loads (for example the rear window heater mentioned above) can be energised with the regenerative current individually and according to requirements.

It should be pointed out that the electric motor 134 itself can also be used as an electrical load for the regenerative current. The regenerative current can therefore be supplied to the electric motor 134 again as a field current during the speed reduction of a rotor of the electric motor 134. The field current can be torque-neutral and as high as the proportion of the generator current which exceeds a current limit value. The regenerative current can therefore be converted into heat within the electromechanical actuator 124.

Figure 2:
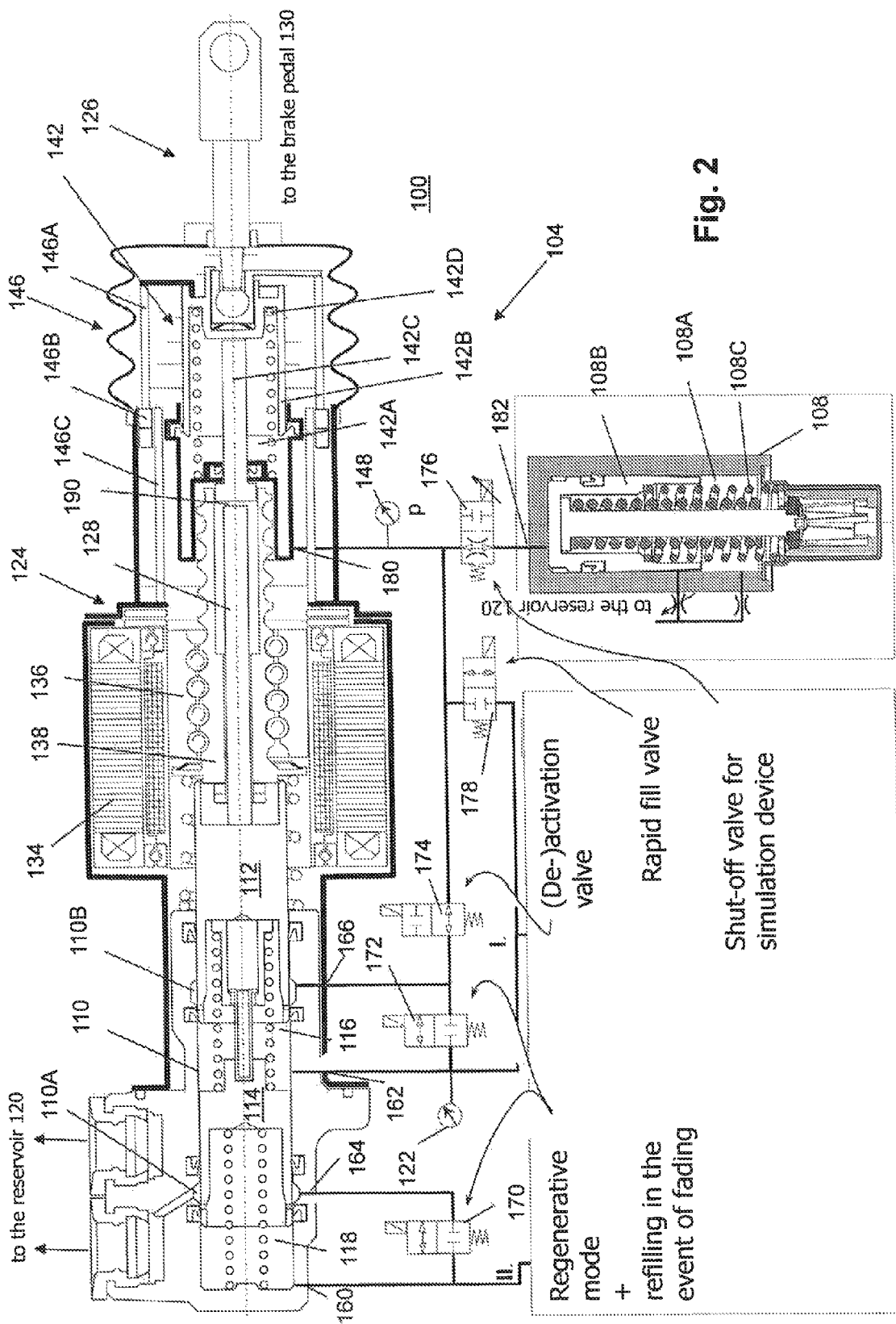
FIG. 2 a second exemplary embodiment of an electrohydraulic vehicle brake system.

FIG. 2 shows a detailed exemplary embodiment of a vehicle brake system 100 which is based on the functional principle explained in connection with the schematic exemplary embodiment of FIG. 1. Identical or similar elements here have been provided with the same reference numerals as in FIG. 1 and they are not explained below. For the sake of clarity, the ECU, the wheel brakes, the valve units associated with the wheel brakes (i.e. the multiplex valves 152, 154, 156, 158 in FIG. 1) of the HCU and the generator for the regenerative braking operation are not shown.

The vehicle brake system 100 shown in FIG. 2 also comprises two brake circuits I. and II., with two hydraulic chambers 116, 118 of a master cylinder 110 in turn being associated with precisely one brake circuit I., II. in each case. The master cylinder 110 has two connections per brake circuit I., II. In this arrangement, the two hydraulic chambers 116, 118 each lead into a first connection 160, 162, by way of which hydraulic fluid can be conveyed out of the respective chamber 116, 118 into the associated brake circuit I., II. Each of the brake circuits I. and II. can furthermore be connected to the non-pressurised hydraulic fluid reservoir (which is not shown in FIG. 2 and has the reference numeral 120 in FIG. 1) by way of a respective second connection 164, 166 which leads into a corresponding annular chamber 110A, 110B in the master cylinder 110.

A valve 170, 172, which is realised as a 2/2-way valve in the exemplary embodiment, is provided in each case between the respective first connection 160, 162 and the respective second connection 164, 166 of the master cylinder 110. The first and second connections 160, 162, 164, 166 can be selectively connected to one another by means of the valves 170, 172. This corresponds to a "hydraulic short circuit" between the master cylinder 110 on the one hand and, on the other, the non-pressurised hydraulic fluid reservoir (which is then connected to the hydraulic chambers 116, 118 by way of the annular chambers 110A, 110B). In this state, the pistons 112, 114 in the master cylinder 110 can be displaced substantially without resistance by the electromechanical actuator 124 or the mechanical actuator 126 ("empty travel activation"). The two valves 170, 172 therefore enable, for example, a regenerative braking operation (generator mode). The hydraulic fluid which is displaced from the hydraulic chambers 116, 118 upon a delivery movement in the master cylinder 110 is then not conducted to the wheel brakes here, but to the non-pressurised hydraulic fluid reservoir, without resulting in a build up of hydraulic pressure at the wheel brakes (which is generally undesirable in regenerative braking mode). A braking effect is then achieved in regenerative braking mode by the generator (cf. reference numeral 102 in FIG. 1).

It should be pointed out that the regenerative braking operation can be implemented per axle. Therefore, in the case of an axle-related brake circuit split, one of the two valves 170, 172 can be closed in regenerative mode and the other can be open. A hydraulic pressure is then built up on the wheel brakes of the closed valves 170, 172 in conventional manner, whilst the braking action of the generator 102 is used on the vehicle axle associated with the wheel brakes of the closed valve 170, 172.

The two valves 170, 172 further enable the hydraulic pressure at the wheel brakes to be lowered. Lowering the pressure in this way can be desirable in the event of a failure (e.g. a blocking) of the electromechanical actuator 124 or in the vehicle-dynamics control operation to prevent a return stroke of the electromechanical actuator 124 (e.g. to prevent a reaction on the brake pedal). Also for lowering the pressure, the two valves 170, 172 are switched into their open position, as a result of which hydraulic fluid can flow from the wheel brakes via the annular chambers 110A, 110B in the master cylinder 110 and back into the hydraulic fluid reservoir.

Finally, the valves 170, 172 also enable the hydraulic chambers 116, 118 to be refilled. Such a refilling can be required during a continuous braking procedure (for example owing to so-called brake "fading"). For refilling purposes, the wheel brakes are fluidically separated from the hydraulic chambers 116, 118 by way of associated valves of the HCU (not shown in FIG. 2). The hydraulic pressure at the wheel brakes is therefore "locked-in". The valves 170, 172 are then opened. Upon a subsequent return stroke of the pistons 112, 114 provided in the master cylinder 110 (to the right in FIG. 2), hydraulic fluid is then drawn out of the non-pressurised reservoir into the chambers 116, 118. The valves 170, 172 can then be closed again and the hydraulic connections to the wheel brakes can be reopened. With a subsequent delivery stroke of the pistons 112, 114 (to the left in FIG. 2), the formerly "locked-in" hydraulic pressure can be increased further.

As shown in FIG. 2, in the present exemplary embodiment both a simulation device 108 and a decoupling device 142 are based on a hydraulic principle. Both devices 108, 142 comprise a respective cylinder 108A, 142A for receiving hydraulic fluid and a piston 108B, 142B received in the respective cylinder 108A, 142A. The piston 142B of the decoupling device is 142 mechanically coupled to a brake pedal which is not illustrated in FIG. 2 (cf. reference numeral 130 in FIG. 1). The piston 142B furthermore has an extension 142c extending through the cylinder 142A in the axial direction. The piston extension 142C extends coaxially to a force-transmission element 128 for the primary piston 112 and is mounted upstream of this in the actuating direction of the brake pedal.

Each of the two pistons 108B, 142B is pre-tensioned in its starting position by a resilient element 108C, 142D (in each case a helical spring here). The characteristic of the resilient element 108C of the simulation device 108 defines the desired pedal reaction behaviour here.

As is furthermore shown in FIG. 2, the vehicle brake system 100 in the present exemplary embodiment comprises three further valves 174, 176, 178 which are realised as 2/2-way valves here. It goes without saying that individual valves or all three of these valves 174, 176, 178 can be omitted in other embodiments in which the corresponding functionalities are not required. It furthermore goes without saying that all of these valves can be part of a single HCU block (cf. reference numeral 106 in FIG. 1).

The first valve 174 is provided, on the one hand, between the decoupling device 142 (by way of a connection 180 provided in the cylinder 142A) and the simulation device 108 (by way of a connection 182 provided in the cylinder 108A) and, on the other hand, the non-pressurised hydraulic fluid reservoir (by way of the connection 166 of the master cylinder 110). The second valve 176, which has a throttle characteristic in its open position, is connected upstream of the connection 182 of the cylinder 108A. The third valve 178 is finally provided between the hydraulic chamber 116 (by way of the connection 116) and the brake circuit I. on the one hand and the cylinder 142A of the decoupling device 142 (by way of the connection 180) on the other.

The first valve 174 enables a selective activation and deactivation of the decoupling device 142 (and indirectly also the simulation device 108). If the valve 174 is located in its open position, the cylinder 142A of the decoupling device 142 is hydraulically connected to the non-pressurised hydraulic reservoir. In this position, the decoupling device 142 is deactivated according to the emergency braking operation. The simulation device 108 is furthermore also deactivated.

The opening of the valve 174 results in it being possible to deliver the hydraulic fluid received in the cylinder 142A substantially without resistance into the non-pressurised hydraulic fluid reservoir when the piston 142B is displaced (as a result of an actuation of the brake pedal). This procedure is substantially independent of the position of the valve 176 since this also has a significant throttle effect in its open position. Therefore, in the open position of the valve 174, the simulation device 108 is also indirectly deactivated.

When the brake pedal is actuated in the open state of the valve 174, the piston extension 142C overcomes a gap 190 between it and the force-transmission element 128 and consequently arrives in contact with the force-transmission element 128. After the gap 190 has been overcome, the force-transmission element 128 is affected by the displacement of the piston extension 142C and therefore actuates the primary piston 112 (and—indirectly—the secondary piston 114) in the master brake cylinder 110. This corresponds to the direct coupling (already explained in connection with FIG. 1) between the brake pedal and master cylinder piston for lowering the hydraulic pressure in the brake circuits I., II. in emergency braking mode.

When the valve 174 is closed (and the valve 178 is closed), the decoupling device 142 is, on the other hand, activated. This corresponds to the service braking operation. When the brake pedal is actuated here, hydraulic fluid is delivered from the cylinder 142A into the cylinder 108A of the simulation device 108. The simulator piston 108B is thereby displaced in opposition to the counter-force provided by the resilient element 108C so that the usual pedal reaction behaviour is established. At the same time, the gap 190 between the piston extension 142C and the force-transmission element 128 is further maintained. The brake pedal is therefore mechanically decoupled from the master cylinder.

In the present exemplary embodiment, the gap 190 is maintained in that, by means of the electromechanical actuator 124, the primary piston 112 is moved to the left in FIG. 2 at least as quickly as the piston 142B moves to the left due to the brake pedal actuation. Since the force-transmission element 128 is coupled mechanically or otherwise (e.g. magnetically) to the primary piston 112, the force-transmission element 128 moves together with the primary piston 112 upon its actuation by means of the gear spindle 138. This slaving of the force-transmission element 128 enables the gap 190 to be maintained.

Maintaining the gap 190 in service braking mode requires precise determination of the travel covered by the piston 142B (and therefore the travel of the pedal). To this end, a travel sensor 146 based on a magnetic principle is provided. The travel sensor 146 comprises a plunger 146*a* which is rigidly coupled to the piston 142B and to the end of which a magnet element 146B is mounted. The movement of the magnet element 146B (i.e. the travel covered by the plunger 146B or piston 142B) is detected by means of a Hall sensor 146C. An output signal of the Hall sensor 146C is evaluated by a control unit which is not shown in FIG. 2 (cf. reference numeral 150 in FIG. 1). The electromechanical actuator 124 can then be triggered based on this evaluation.

Now to the second valve 176, which is connected upstream of the simulation device 108 and can be omitted in some embodiments. This valve 176 has a predetermined or adjustable throttle function. For example, a hysteresis or other characteristic for the pedal reaction behaviour can be achieved by means of the adjustable throttle function. The movement of the piston 142B (in the case of closed valves 174, 178) and therefore the brake pedal travel can furthermore be restricted by selectively blocking the valve 176.

In its open position, the third valve 178 enables hydraulic fluid to be delivered from the piston 142A into the brake circuit I or the hydraulic chamber 116 of the master cylinder 110 and vice versa. Delivering fluid from the piston 142A into the brake circuit I enables, for example, rapid braking (e.g. before the onset of the delivery effect of the electromechanical actuator 124), in which case the valve 178 is immediately closed again. Furthermore, when the valve 178 is open, it is possible to achieve a hydraulic reaction on the brake pedal (e.g. a pressure modulation generated by means of the electromechanical actuator 124 in the vehicle-dynamics control operation) by way of the piston 142B.

In a hydraulic line leading into the connection 180 of the cylinder 142A, a pressure sensor 148 is provided whereof the output signal enables an inference about the actuating force on the brake pedal. The output signal of this pressure sensor 148 is evaluated by a control unit (not shown in FIG. 1). Based on this evaluation, it is then possible to control one or more of the valves 170, 172, 174, 176, 178 to realise the functionalities outlined above. It is furthermore possible to control the electromechanical actuator 124 based on this evaluation.

It is possible to use the HCU 106 illustrated in FIG. 1 in the brake system 100 shown in FIG. 2. In this embodiment, the multiplex arrangement according to FIG. 1 (with a total of four valves in addition to the valves shown in FIG. 2) can therefore be used for the brake system 100 shown in FIG. 2.

In the brake system 100 according to FIG. 2, in addition to the four multiplex valves (reference numerals 152, 154, 156, 158 in FIG. 1) it is possible to include further valves in the multiplex operation. In particular, the multiplex operation can therefore be extended to the valve 178. In such a case, instead of four time slots, a multiplex cycle could then encompass five time slots which are each associated with one of the valves 152, 154, 156, 158, 178. In that time slot with which the valve 178 is associated, hydraulic fluid can be delivered from the hydraulic chamber 116 into the cylinder 142A, and removed again, by means of the electromechanical actuator 134. This enables a haptic feedback on the brake pedal to be produced using the electromechanical actuator 124. This haptic feedback can take place for example in a vehicle-dynamics control operation. Hydraulic fluid pulsations can therefore be generated in the cylinder 142A, which indicate an ABS control operation.

In the case of the brake system 100 according to FIG. 2, the regenerative current can be used in the same manner as for the vehicle brake system explained in conjunction with FIG. 1. It would be additionally conceivable for the valve 178 to also be energised with the regenerative current, in particular when the valve 178 is included in the multiplex operation. Further valves, such as the valves 170, 172 could also be used for these purposes.

Figure 3:
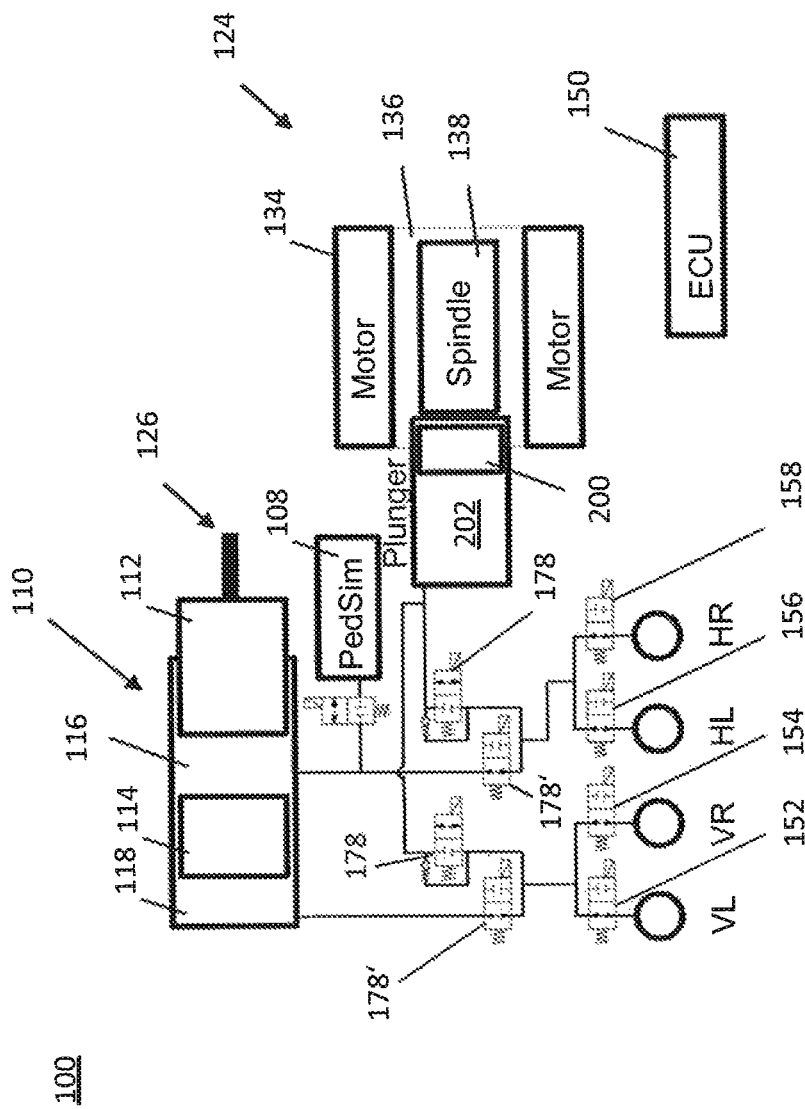
FIG. 3 a third exemplary embodiment of an electrohydraulic vehicle brake system.

FIG. 3 shows a further exemplary embodiment of a brake system 100. Corresponding or comparable elements to those of the exemplary embodiments according to FIGS. 1 and 2 are in turn denoted by the same reference numerals. Deviating from the exemplary embodiments of FIGS. 1 and 2, the electromechanical actuator 124 in the exemplary embodiment according to FIG. 3 does not act on the primary piston 112 in the master cylinder 110. Instead, the electromechanical actuator 124 acts on a piston 200 which is received in a separate cylinder 202 and can be fluidically coupled to the wheel brakes VL, VR, HL and HR. The piston 200 is a plunger piston.

The brake system 400 according to FIG. 3 is also based on the BBW principle. Normally, i.e. in BBW mode, the master cylinder 110 is fluidically decoupled from the wheel brakes VL, VR, HL and HR. To this end, two shut-off valves 178 are provided, which are located in each case in the hydraulic line between one of the hydraulic chambers 116, 118 on the one hand and the wheel brakes VL, VR, HL and HR on the other.

The valves 178' are only open in a "push-trough" mode of the brake system 100. In this mode, hydraulic fluid can be displaced from the chambers 116, 118 to the wheel brakes VL, VR, HL and HR by means of a mechanical actuator 126 which is coupled to a brake pedal not shown in FIG. 3 (the multiplex valves 152, 154, 156, 158 are then open). In regular BBW mode, on the other hand, the hydraulic pressure at the wheel brakes VL, VR, HL and HR is built up by means of the electromechanical actuator 124 and the displacement of the plunger piston 200 when the valves 178' are closed. To this end, valves 178 between the cylinder 202 on the one hand and the wheel brakes VL, VR, HL and HR on the other should be opened.

In the present exemplary embodiment, the four valves 154, 156, 158, which are in turn associated with the four wheel brakes VL, VR, HL and HR, are included in the multiplex operation. The multiplex operation can proceed in the manner outlined above in connection with FIGS. 1 and 2. According to one variant, the multiplex operation additionally comprises at least one of the two further valve arrangements shown in FIG. 3, which each comprise two valves 178, 178'.

As described above, a regenerative current of the electric motor 134 could be used to energise one or more of the four valves 152, 154, 156, 158 associated with the wheel brakes VL, VR, HL and HR. Additionally or alternatively to this, other valves of those shown in FIG. 3 could be acted upon by the regenerative current, as already explained in connection with FIG. 2.

Figure 4:
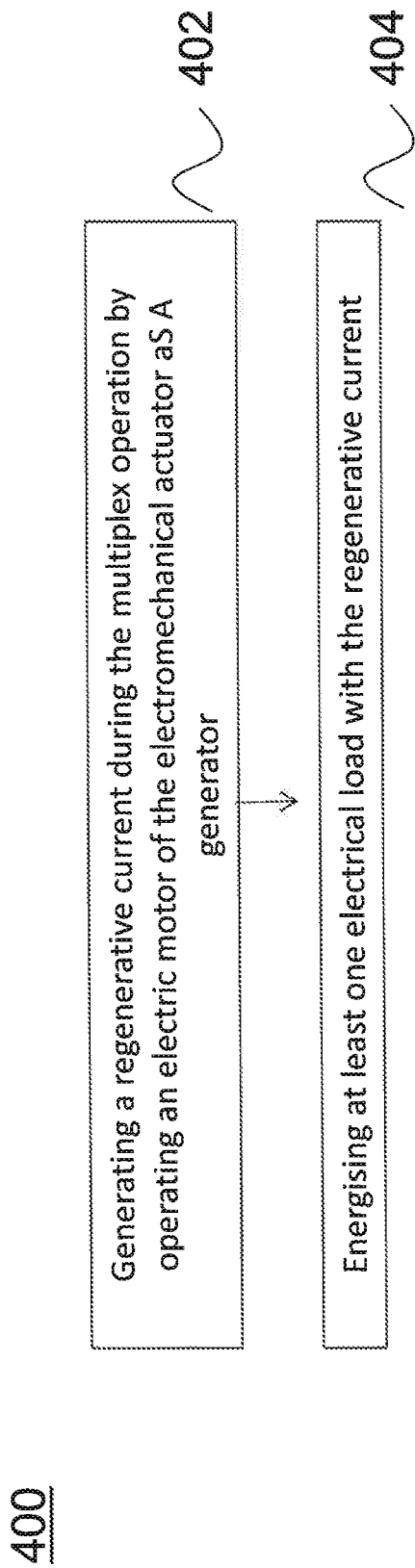
FIG. 4 an exemplary embodiment of a method for operating the electrohydraulic vehicle brake system according to one of FIGS. 1 to 3.

FIG. 4, in the form of a chart 400, shows the steps proposed here in general for lowering the regenerative current peaks. The method explained in FIG. 4 could be used in the brake system 100 according to one of FIGS. 1 to 3.

In an initial step, which is not shown in FIG. 4, a situation is recognised which calls for vehicle-dynamics control (e.g. ABS control). As a result of this vehicle-dynamics control, the valves 152, 154, 156, 158 are controlled on a time-slot basis in a multiplex operation. During the multiplex operation, the electric motor 134 of the electromechanical actuator 124 is also operated time-synchronously. The motor speed of the electric motor has to be reduced during individual time slots here so that the electric motor switches to generator mode and generates a regenerative current (cf. step 402 in FIG. 4).

Figure 5:
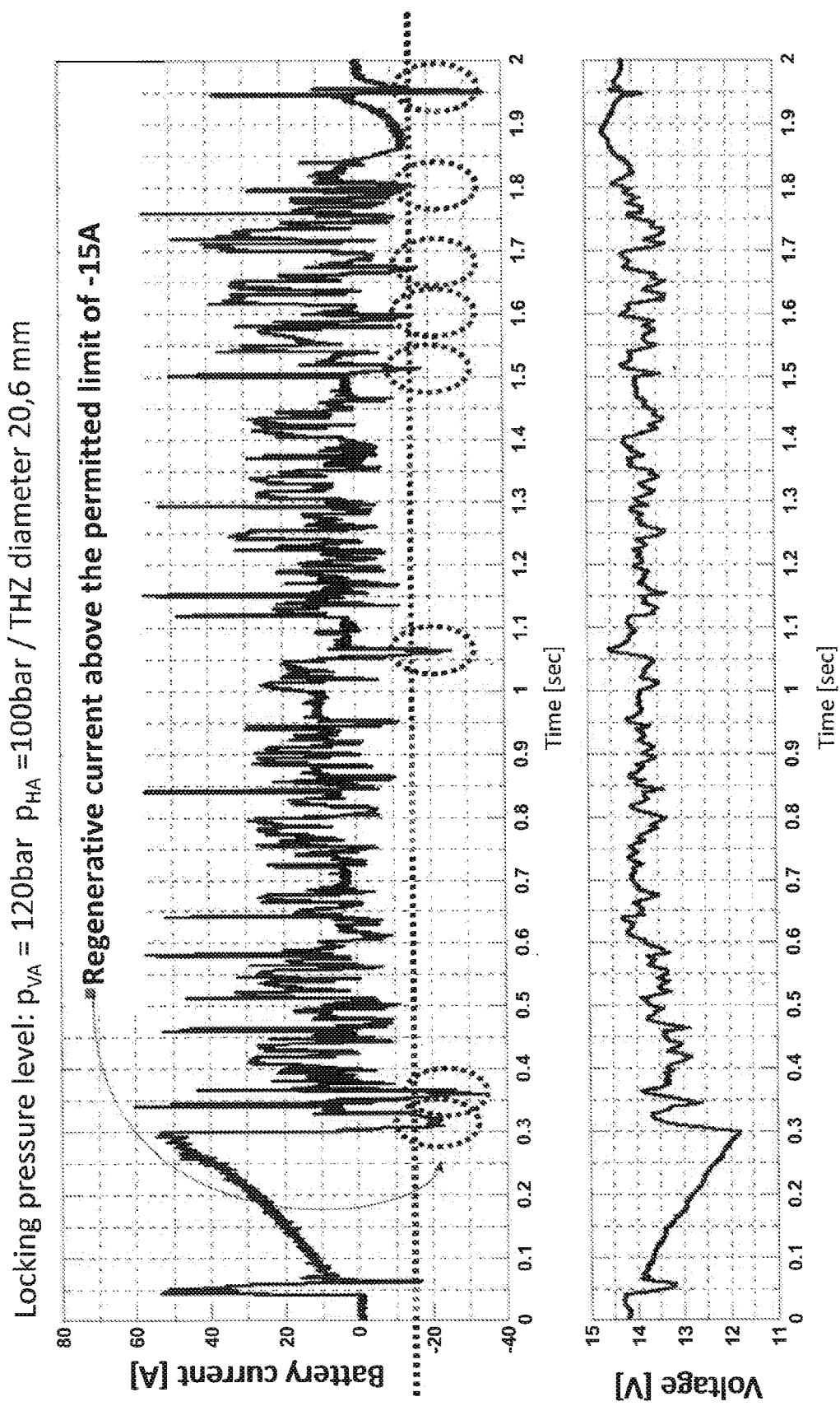
FIG. 5 a schematic graph which shows the emergence of regenerative current peaks.

In a schematic graph, FIG. 5 shows the behaviour over time of the voltage of the vehicle electrical system and the current of the vehicle electrical system (battery current) within the framework of the multiplex operation described above. This assumes an ABS pressure level of 120 bar on the wheel brakes VL, VR of the front axle and an ABS pressure level of 100 bar on the wheel brakes HL, HR of the rear axle and a diameter of the master cylinder 110 of 20.6 mm.

As shown in FIG. 5, regenerative current peaks of considerably greater than −15 A occur repeatedly within the framework of the multiplex operation (which can also lead to peaks in the voltage of the vehicle electrical system). These peaks are linked to a particularly pronounced or rapid speed reduction of the electric motor 134.

To prevent damage to electrical vehicle components as a result of the regenerative current peaks, at least one electrical load is briefly energised with the regenerative current in step 404. Several examples of electrical loads have already been mentioned in connection with FIGS. 1 to 3.

In this regard, it should again be pointed out that the electric motor 134 itself can also be used as an electrical load in connection with the regenerative current. The current for operating the electric motor 134 (here a synchronous motor) has a torque-forming component and a magnetic-field-weakening component. When the electric motor 134 is energised with the regenerative current, the magnetic-field-weakening component is increased whilst the torque-forming component is maintained. The input of the electric motor 134 thus increases, thereby enabling the regenerative current to be at least partially compensated.

According to one implementation, the energising of the electrical load can take place synchronously with the operation of the electromechanical actuator. According to a further implementation, operating states of the electric motor can be evaluated in advance and an energising of the electrical load with the regenerative current can be restricted to such cases as those in which a particularly high regenerative current is to be expected (for example owing to a particularly high speed reduction or a speed reduction in a particularly short time period).

Additionally or alternatively to the prior evaluation of the regenerative current on the basis of motor parameters, such as for example the expected speed reduction of the electric motor, an expected revision of the movement direction of the electric motor and/or on the basis of the time period in which the speed reduction or reversal of the movement direction takes place, the regenerative current can be measured directly according to one implementation and a load can be energised selectively on the basis of the measurement result in order to lower the regenerative current or regenerative current peaks.

Figure 6:
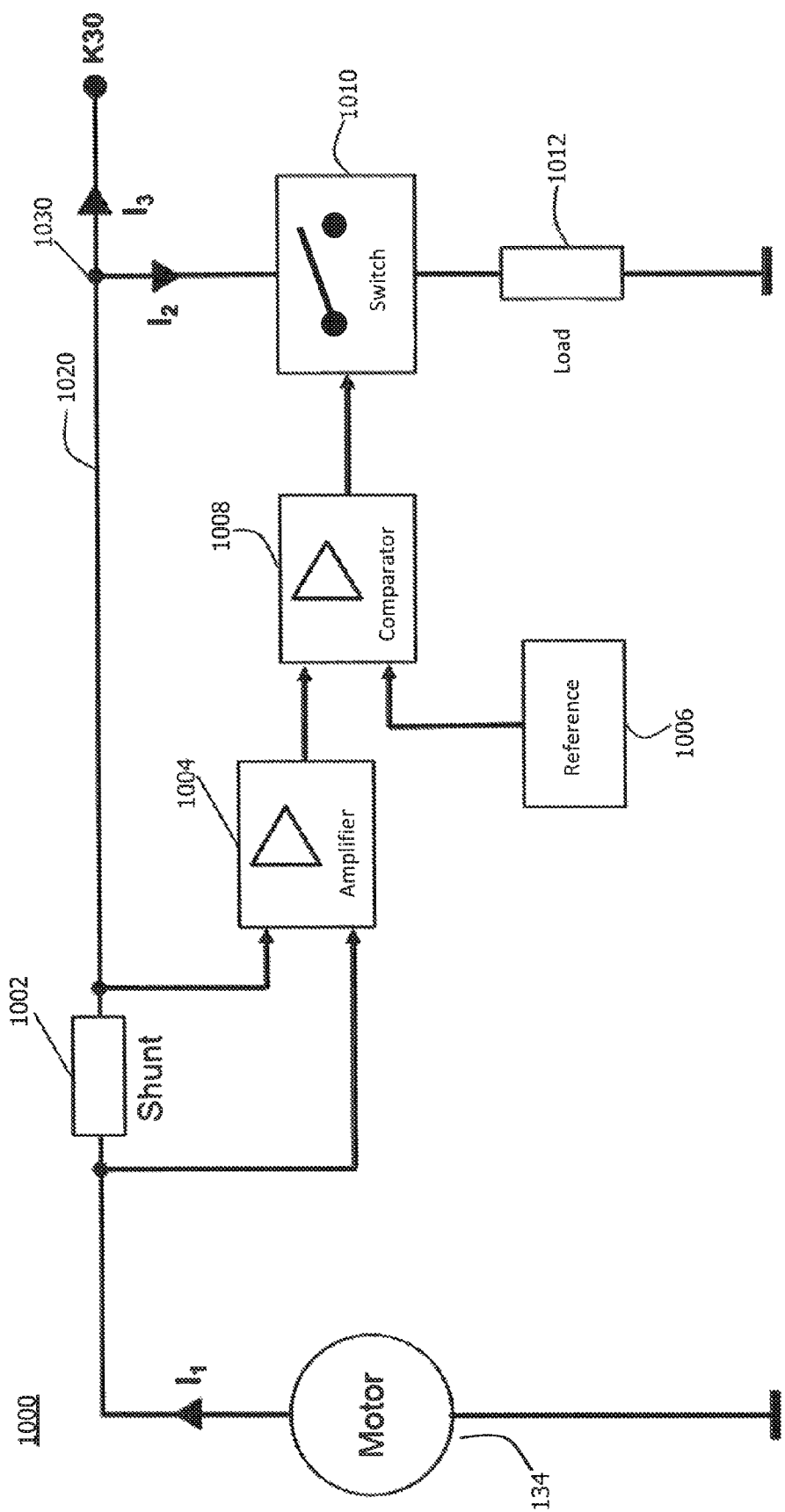
FIG. 6 a device for lowering or reducing regenerative current peaks.
Figure 7:
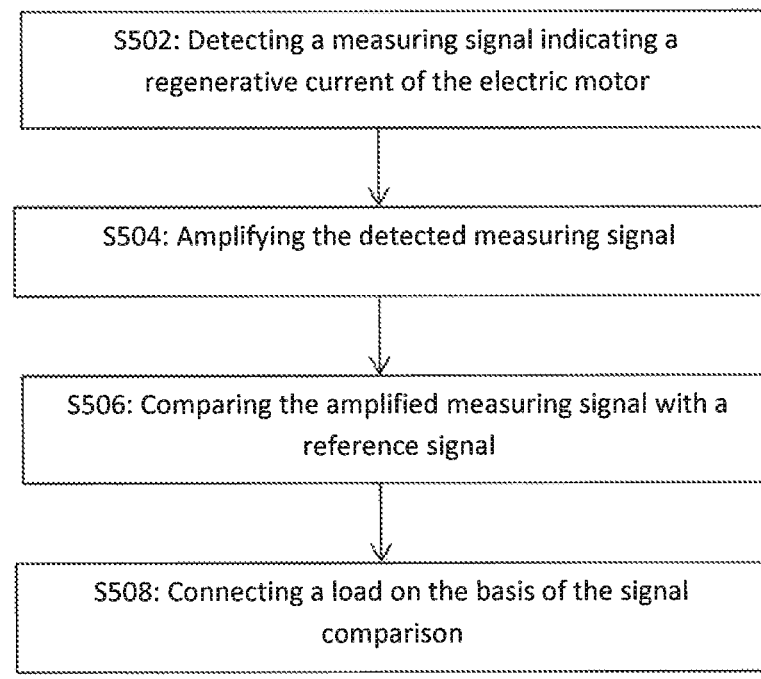
FIG. 7 an exemplary embodiment of a method for lowering or reducing regenerative current peaks.

FIGS. 6 and 7 show an electrical circuit diagram of an electrical device 1000 and a method for lowering or reducing regenerative currents and/or regenerative current peaks. The electrical device 1000 shown in FIG. 6 can be part of the electronic control device or control device system 150 of the motor-vehicle brake system 100 here. It can be implemented in the electronic control device or control device system 150 (e.g. as a subunit). Alternatively to this, the device 1000 can be constructed as a stand-alone device 1000 of the brake system 100. The method carried out by the device 1000 is stored in the form of software routines in the electronic control device or control device system 150.

FIG. 6 shows an electrical circuit diagram of the device 1000. It comprises a shunt resistor 1002, an amplifier 1004, a reference signal transmitter 1006 and a comparator 1008. The measuring device 1000 can further comprise a switching device 1010. The switching device 1010, the comparator 1008 and the amplifier 1004 can be realised by transistors or known transistor circuits.

The shunt resistor 1002 is arranged in series with the electric motor 134 in a connecting line 1020 electrically connecting the electric motor 134 to the vehicle electrical system (denoted by K30 in FIG. 6). The shunt resistor 1002 is constructed as a low-impedance resistor and is provided in the connecting line 1020 in order to provide a measuring signal in the form of a voltage signal which is independent of the current flowing over the connecting line 1020 and over the shunt resistor 1002. According to ohmic law, the voltage signal is proportional in terms of its voltage level to the current flowing in the connecting line. The sign of the voltage signal which can be picked off at the shunt resistor 1002 furthermore reflects the flow direction of the current so that it is possible to differentiate between load currents (in normal operation the electric motor consumes current from the vehicle electrical system) and regenerative currents (the electric motor is operated as a generator (step 402) and the current generated by the electric motor 134 is fed back to the vehicle electrical system).

The amplifier 1004 which is arranged in parallel with the shunt resistor 1002 is electrically coupled on the input side to the shunt resistor 1002. On the output side, the amplifier 1004 is electrically coupled to a first input of the amplifier 1008. The amplifier 1004 is designed to amplify the voltage signal which can be picked off at the shunt resistor 1002 and supply the amplified measuring signal to the comparator 1008.

The reference signal transmitter 1006 is designed to generate a reference signal (reference voltage signal) and supply it to the comparator 1008. To this end, it is electrically coupled to a second input of the comparator 1008.

The amplifier 1008 which is electrically coupled to the output of the amplifier 1004 and the output of the reference signal transmitter 1006 is designed to compare the amplified measuring signal (voltage signal) with the reference signal and provide an actuating signal based on the comparison for the switching device 1010.

The switching device 1010 is electrically coupled to the output of the comparator 1008 and is designed to switch into a closed or an open state according to the actuating signal. The comparator 1008 generates the actuating signal according to the comparison of the input signal with the reference signal in such a way that it is able to switch the switching device 1010 into a closed state when the (amplified) input signal exceeds the reference signal. In the closed state, the switching device connects a load 1012 to the connecting line 1020 or to the vehicle electrical system. As seen from the electric motor 134, a current which is supplied by the electric motor 134 in generator mode (regenerative current $I_1$ in FIG. 6) can then flow in the direction of ground potential at the node 1030 as a branch current $I_2$ by way of the switching device 1012 and the load 1012. In this way, according to Kirchhoff's first law, only that proportion of the current $I_3$ which corresponds to the supplied current less the branch current $I_2$, is fed to the vehicle electrical system. By selecting the appropriate load resistance of the load 1012, it is possible to specify the proportion of current flowing via the load 1012. The load resistance of the load 1012 is selected so that a large proportion of the current generated by the electric motor 134 as a generator can flow via the load 1012. This prevents a high regenerative current, which places a load on the vehicle electrical system, from flowing back into the vehicle electrical system.

An electrical load, which is part of the brake system, or another electrical load of the motor vehicle can serve as the load 1012, as already discussed above in connection with FIGS. 1 to 5. A resistor or a variable circuit of resistors, which converts the current or electrical energy flowing over the resistor into heat, can serve as the load 1012.

In a flow chart 500, FIG. 7 shows an exemplary embodiment for automatically reducing or lowering regenerative currents or regenerative current peaks with the aid of the device 1000 shown in FIG. 6. The method can be implemented within the framework of the method shown in FIG. 4.

If the electric motor 134 is operated as a generator (step 402), a measuring signal indicating a regenerative current is firstly detected in a first step S502. The measuring signal here is a voltage signal which decreases by way of the shunt resistor 1002. The level of the regenerative current can be accurately detected with the aid of the shunt resistor 1002, which is arranged in series, and with the aid of the amplifier 1004, which is arranged in parallel with the shunt resistor 1002, since the voltage decreasing by way of the shunt resistor 1002 is directly proportional to the current flowing over the shunt resistor 1002 (and therefore to the regenerative current of the generator). In particular, the sign of the voltage decreasing at the shunt resistor 1002 reflects the direction of the current flow so that it is possible to differentiate between a regenerative current coming from the motor and an operating current for the electric motor 134, which is supplied by the vehicle electrical system.

The voltage decreasing at the shunt resistor 1002 is picked off and supplied to the amplifier 1004. The voltage can be picked off continuously or in predetermined time periods. In a subsequent second step S504, the voltage signal which is proportional to the regenerative current is amplified. The amplified signal is then supplied to the comparator 1008.

In the next, third step S506, the amplified voltage signal is compared in the comparator 1008. For comparison purposes, a reference signal is supplied to the comparator 1008 by the reference signal transmitter 1006. The reference signal serves as a threshold value for the detected voltage signal. If the detected (and amplified) voltage signal exceeds the value of the reference signal, an actuating signal is supplied at the output of the comparator 1008, which switches the switch device 1012 from an open state into a closed state. If, on the other hand, the measured and amplified voltage value is smaller than or equal to the reference voltage, then an actuating signal is emitted which switches the switch device 1012 into an open switch position.

Therefore, by way of the supplied reference voltage, a threshold value is specified for a maximum permissible regenerative current which can be fed into the vehicle electrical system. If the regenerative current (or the voltage signal which is proportional to the regenerative current) exceeds the threshold value, a load is connected to the electric motor 134 (step S508). After connection of the load, this is energised with the current supplied by the electric motor 134 (step 404 in FIG. 4), as a result of which at least some of the power generated by the electric motor 134 is consumed before it is fed into the vehicle electrical system.

The switch device 1012 is always switched to a closed state by means of an actuating signal emitted by the comparator when the regenerative current exceeds a specified threshold value. Conversely, the switch device 1012 is always switched to an open state (so long as the switch device 1012 was closed) by a corresponding actuating signal of the comparator 1008 when the regenerative current does not exceed the specified threshold value. Peaks in the regenerative current which are hazardous to the vehicle electrical system can therefore be eliminated (see FIG. 5) since the load 1012 is always connected when such peaks occur. Depending on the specified level of the threshold value, a proportion (current peak values) of the generated regenerative current or even the entire regenerative current can be eliminated. All in all, the teaching presented here prevents harmful effects of the regenerative current. It is thus possible to reliably protect sensitive electrical loads of the motor vehicle, for example control devices, from regenerative current peaks. This increases vehicle safety. The method is particularly suitable for brake systems which are equipped with valve arrangements controlled in multiplex mode. It has been recognised that the multiplex operation can result in particularly pronounced regenerative current peaks.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

The invention claimed is:

1. A method for operating an electrohydraulic motor-vehicle brake system which has a master cylinder, an electromechanical actuator for generating a hydraulic pressure at a plurality of wheel brakes, and a set of electrically actuable valve arrangements, the set of valve arrangements each comprising a first valve arrangement between the master cylinder and each wheel brake in order to generate the respective braking pressure intended for each of the wheel brakes by means of the electromechanical actuator, comprising the steps:
generating a regenerative current by operating an electric motor of the
electromechanical actuator as a generator; and
energising at least one electrical load with the regenerative current, wherein the at least one electrical load comprises at least one valve arrangement from the set of valve arrangements.

2. A method according to claim 1, wherein the first valve arrangements can be controlled in a multiplex operation with the regenerative current being generated during the multiplex operation by operating the electric motor as a generator.

3. A method according to claim 1, further comprising: connecting an electrical load to the electric motor in order to fully or partially consume the regenerative current generated by the electric motor in generator mode.

4. A method according to claim 3, further comprising:
detecting a signal which indicates a regenerative current generated by the electric motor; and
comparing the signal to a reference signal indicating an upper current limit.

5. A method according to claim 4, further comprising: connecting the electrical load to the electric motor when the signal exceeds the reference signal.

6. A method according to claim 1, wherein the at least one electrical load is part of the electrohydraulic motor-vehicle brake system.

7. A method according to claim 1, wherein the at least one electrical load is the electric motor.

8. A method according to claim 7, wherein a field current is generated by the regenerative current in the electric motor.

9. A method according to claim 1, wherein the at least one valve arrangement provided as an electrical load comprises at least one of the first valve arrangements.

10. A method according to claim 1, wherein the set of valve arrangements comprises at least one second valve arrangement which enables the additional connection of a hydraulic simulation device for a pedal reaction behaviour, and wherein the at least one valve arrangement provided as an electrical load comprises at least the second valve arrangement.

11. A method according to claim 1, wherein the at least one valve arrangement is energised by means of the regenerative current with a higher current than in normal mode.

12. A method according to claim 1, wherein the regenerative current is fed to the at least one valve arrangement via a pulse-width modulation.

13. A computer program product with a program code for performing a method for operating an electrohydraulic motor-vehicle brake system which has a master cylinder, an electromechanical actuator for generating a hydraulic pressure at a plurality of wheel brakes, and a set of electrically actuable valve arrangements, the set of valve arrangements each comprising a first valve arrangement between the master cylinder and each wheel brake in order to generate the respective braking pressure intended for each of the wheel brakes by means of the electromechanical actuator, comprising the steps:
generating a regenerative current by operating an electric motor of the
electromechanical actuator as a generator; and
energising at least one electrical load with the regenerative current, wherein the at least one electrical load comprises at least one valve arrangement from the set of valve arrangements when the computer program product runs on at least one processor.

14. A motor-vehicle control or control system comprising the computer program product according to claim 13.

15. An electrohydraulic motor-vehicle brake system comprising:
a master cylinder;
an electromechanical actuator for generating a hydraulic pressure at a plurality of wheel brakes; and
a set of electrically actuable valve arrangements each with a first valve arrangement between the master cylinder and each wheel brake in order to generate the respective braking pressure intended for each of the wheel brakes by the electromechanical actuator; and
a control device or control device system which is designed for
generating a regenerative current by operating an electric motor of the electromechanical actuator as a generator; and
energising at least one electrical load with the regenerative current, wherein the at least one electrical load comprises at least one valve arrangement from the set of valve arrangements.

16. An electrohydraulic motor-vehicle brake system according to claim 15, wherein the control device or control device system is designed to control the first valve arrangements in multiplex mode, with the regenerative current being generated during the multiplex operation by operating the electric motor as a generator.

17. An electrohydraulic motor-vehicle brake system according to claim 15, wherein the control device or control device system is designed:
to detect a signal which indicates a regenerative current generated by the electric motor; and
to compare the signal with a reference signal indicating an upper current limit.

18. An electrohydraulic motor-vehicle brake system according to claim 17, wherein the control device or control device system is designed:
to connect the electrical load to the electric motor when the signal exceeds the reference signal.

19. A brake system according to claim 15, wherein the electromechanical actuator acts on a piston received in the master cylinder.

20. A brake system according to claim 15, wherein the electromechanical actuator is designed to act on a piston which is guided in a cylinder provided in addition to the master cylinder, with the additional cylinder being fluidically coupleable or coupled to wheel brakes.

* * * * *